C. A. GRISWOLD.
CORSET.
No. 10,244. Reissued Nov. 21, 1882.
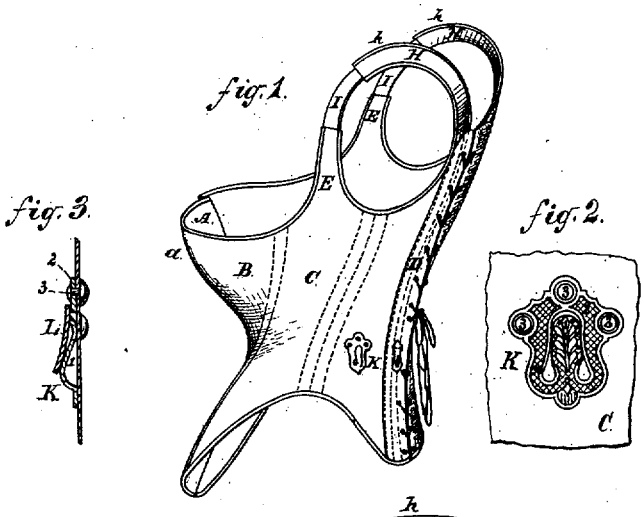
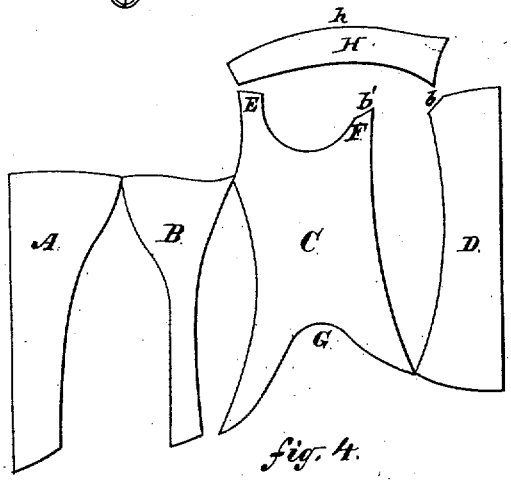
fig. 4.
Witnesses:
Henry Giddings
A. G. Wermuly
Inventor
Catharine A. Griswold
by H. Fitch
her Atty.
N. PETERS, Photo-Lithographer, Washington, D. C.

UNITED STATES PATENT OFFICE.

CATHARINE A. GRISWOLD, OF NEW YORK, N. Y.

CORSET.

SPECIFICATION forming part of Reissued Letters Patent No. 10,244, dated November 21, 1882.

Original No. 116,585, dated July 4, 1871; Reissue No. 7,895, dated September 25, 1877. Application for reissue filed July 26, 1882.

*To all whom it may concern:*

Be it known that I, CATHARINE A. GRISWOLD, of the city, county, and State of New York, (formerly of Willimantic, Connecticut,) have invented certain new and useful Improvements in Corsets; and I do hereby declare the following to be a full, clear, and exact description of the same, reference being had to the accompanying drawings, which form a part of this specification, and in which—

Figure 1 represents a perspective view of my improved corset. Fig. 2 represents a front view of one of my skirt-supporting hooks. Fig. 3 represents a central vertical section of the same, and Fig. 4 represents the form of the pieces from which the skirt is made.

The nature of my invention consists in the improvement in corsets as hereinafter described.

In the drawings the parts marked A, B, C, and D represent the pieces from which each half of the corset is composed, A indicating the first piece of the front and D the piece at the back. The two pieces A and B are formed wide at the top and narrow at their central and lower portions, thus allowing, when these parts are put together, the peculiar fullness at the breast *a*. The side piece, C, should be cut, as represented, with an upward projection, at E, at its upper front corner, and with a less projection at its upper rear corner F, the upper corner F being slanted off, as shown at *b'*, while the lower edge is scalloped out in the form shown at G to allow space for the hip of the wearer. The back piece is formed preferably larger at the top than in ordinary corsets, its upper portion extending above the projection F of the side piece, C, and its upper corner slanted off, as shown at *b*, to enable the top lines, *b* and *b'*, of the two pieces to coincide.

The shoulder-straps H are cut curving, as represented in the drawings. They are attached at their rear end permanently to the slanted portions *b b'*, and extend up over the shoulder, as shown in Fig. 1, and are joined in front by means of a section of elastic braid or tape, I, to the upper extremity of an upward projecting portion, E, of the side piece, C, in the manner illustrated in Fig. 1. The form and curvature of the straps and their attachment to the corset with the convex edges toward the neck of the wearer, as shown in said Fig. 1, enable them to fit smoothly upon the slope of the shoulders of the wearer and keep their places thereon, so as to sustain the corset and prevent it from slipping down on the person without chafing or annoyance.

The halves of the corset are joined to each other in the back by lacings, as indicated, steel or other springs or braces being arranged in each half in the usual way. The front edges of the halves are furnished with the ordinary springs and clasps, which secure the corset about the waist of the wearer, as usual, while a suitable number of springs or braces are arranged at different portions of the body of the corset to provide the required support for the body.

K represents skirt-supporting hooks, which may be secured to the waist of the corset at the sides and back in the positions indicated. They are formed of sheet metal, the points 1 being cut and thrown up from the center of the attaching-plates 2 in the form shown. The hooks may be attached to the body of the corset by means of metallic rivets. When such rivets are used, their heads, which rest against the inner side of the corset and next to the body of the wearer, may be covered with cloth, so as to form a smooth and desirable finish. The belts of the under-garments and skirts may be furnished with loops to pass over the hooks K, and thereby support the garments.

E represents side supports, that project from the front upper edges of the parts C to or about the height of the rear projections F, as shown in the drawings, so as to serve as points of attachment of the front ends of the shoulder-straps H, and also as side supports to the breasts of the wearer. They thus serve an important office, particularly upon full-breasted persons.

As will be seen, the subject of my improvement is a corset composed of the parts and constructed as shown and described.

What I claim, and desire to secure by Letters Patent, is—

1. As an improved article of manufacture, a corset composed of the parts A, B, C, and D and the shoulder-straps H, curved, as shown, to fit smoothly the slope of the shoulders of the wearer, and permanently attached to the sloping edges *b b'* of the parts C and D, all as and for the purpose described.

2. As an improved article of manufacture, the herein-described corset, provided with the projections E, extending upward from the front upper edges of the parts C, for the attachment of shoulder-straps H, and to serve as side supports of the breasts of the wearer, as shown and described.

CATHARINE A. GRISWOLD.

Witnesses:
A. G. N. VERMILA,
GEO. H. BEEBEE.